Jan. 3, 1950     B. P. LABENSKY     2,493,296
TRI-LOBE FLOAT
Filed June 16, 1945

INVENTOR
B. P. Labensky
BY Gifford J. Holmes
AGENT.

Patented Jan. 3, 1950

2,493,296

UNITED STATES PATENT OFFICE 2,493,296

TRILOBE FLOAT

Boris P. Labensky, Milford, Conn., assignor to United Aircraft Corporation, East Hartford, Conn., a corporation of Delaware Application June 16, 1945, Serial No. 599,937

5 Claims. (Cl. 244—105)

This invention relates to alighting gear for aircraft, and more particularly to improved floats for helicopters having vibration properties for preventing the building up of high frequency vibrations.

An object of the present invention is to provide alighting gear for aircraft having low period vibration characteristics.

A further object is to provide for aircraft a float with a plurality of chambers containing a fluid, or fluids, at different pressures so that the total period of vibration thereof will be slower, and hence damping, with respect to the frequency of vibration of other parts of the aircraft.

The foregoing, and other objects will be either obvious or pointed out in the following specification and claims.

Figure 1:
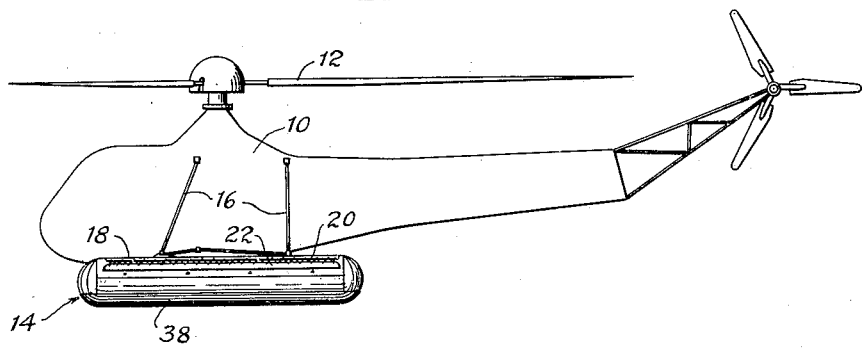
Fig. 1 is a side elevational view of a helicopter equipped with the improved floats of this invention.

In Fig. 1, a helicopter 10 is equipped with a sustaining rotor 12 driven by an engine, not shown. The helicopter 10 has a pair of floats, only one of which 14 is shown, supported by braces 16 shown as being carried on the sides of the helicopter. The braces 16 have a pair of horizontally extending members 18 on which laces 20 secured to a flap 22 on the side of the float 14 hold said float in place. The float when held in position will support the helicopter 10 upon the ground or displace sufficient water to sustain the helicopter upon water. Thus, the helicopter is amphibious and can operate equally as well from land, water, mud, snow, or ice.

Figure 2:
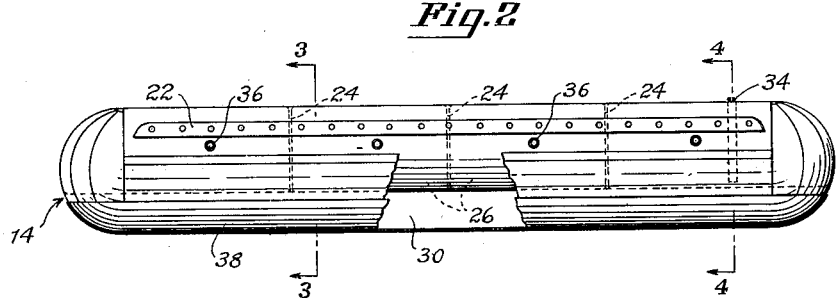
Fig. 2 is a side view with parts broken away showing the details of construction of a float.
Figure 3:
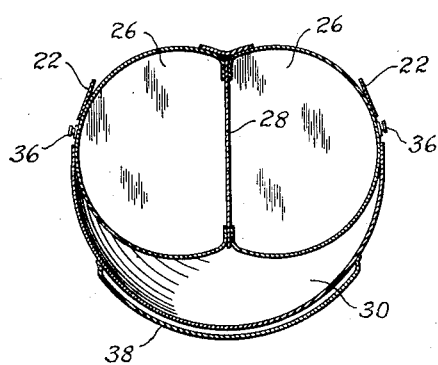
Fig. 3 is a sectional view taken along the lines 3—3 of Fig. 2.
Figure 4:
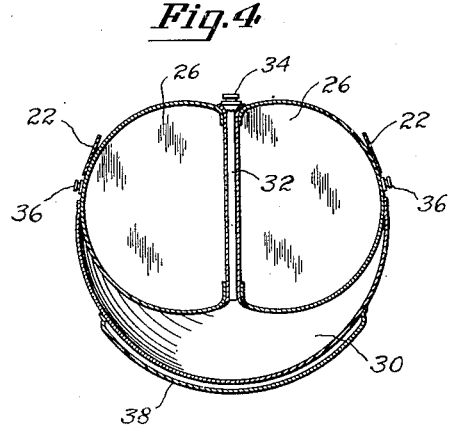
Fig. 4 is a sectional view taken along the lines 4—4 of Fig. 2.

In Fig. 2, the float 14 is shown as comprising a center portion of generally cylindrical shape, and two hemispherical ends sealing the same. Partitions 24 may be provided to divide upper cells 26, which cells 26 are divided from each other by a longitudinally extending partition 28. The upper cells 26 are constructed to contain a fluid at a first pressure to keep the cells in generally the shape indicated in Figs. 3 and 4. A lower cell 30 is sealed from the upper cells 26 and is adapted to contain fluid at a second pressure, which may be different than that in cells 26. Fluid is supplied to the chamber 30 through a tube 32 passing between the chambers 26 and closed by a plug 34. The cells 26 are filled through openings closed by plugs 36 carried at the sides of the chambers 26. An abrasion strip 38 is secured to the bottom of the lower chamber 30 so that the chamber will resist scuffing when operating from the ground, or other hard surfaces.

In this invention, the upper chambers 26 are filled with air (or other fluid) at a first pressure, and the chamber 30 formed by the lower portion of the float and the exterior of the lower part of the upper chambers 26 contains air (or other fluid medium) at a somewhat lower pressure. Thus, for a given application of force applied to the abrasion strip 38, the air therein will be compressed which in turn will compress the air within the chambers 26. Due to the different pressures within the chambers, the frequency of vibration of the lower wall of the chamber 30 has a different natural period from the frequency of vibration of the lower walls of the chambers 26. Thus, upon compression, the intermediate wall separating the chambers 26 from the chamber 30 will vibrate at a frequency intermediate, or as a harmonic or beat function, of the vibration sent through the chamber 30 and chambers 26 from the connecting parts of the craft to the supporting surface.

When the helicopter 10 contacts the ground with one float 14 before another float, a force compressing the air within the chambers 26 and 30 will be exerted and this force will tend to rotate the body of the helicopter 10 to bring the other float down to the ground. Inasmuch as the rotors 12 in most rotary wing aircraft are hinged for movement in one or more planes or senses, cyclic vibrations may build up vibrations in phase with vibrations of the floats. However, because the float of this invention provides a slow period, and in other instances, a period corresponding to beat vibrations of the two different natural vibrations of the chambers 26 and 30, the period of vibration affecting the craft will be low and hence not resonant with rotor blade vibration frequencies except at very low speeds of the rotor below critical ranges.

While I have shown my device as comprising a pair of upper high pressure chambers and a single lower low pressure chamber, it would be equally applicable with variations of the pressure ratio, or with different pressures in each of the chambers, for example. It is apparent that other arrangements of and number of cells could also be used without departing from the spirit of the invention. For this reason, I wish not to be limited in my invention only to that form shown and described but by the scope of the following claims.

I claim:

1. In a helicopter, a body having operating parts that vibrate under some conditions, in combination with means for preventing such vibrations from being transferred to a supporting surface for said aircraft and transferred back to said aircraft in phase with such vibrations consisting of one or more floats, each float comprising a first variable volume chamber adapted to contain a gas at a pressure to provide a natural vibration for its walls at a first frequency and having one wall which constitutes a landing surface engaging portion, and at least one other variable volume chamber between said first chamber and the body of the helicopter adapted to contain a gas at a different pressure to provide a natural vibration for its walls at a second frequency.

2. In a helicopter, a body having operating parts that vibrate under some conditions, in combination with means for preventing such vibrations from being transferred to a supporting surface for said aircraft and transferred back to said aircraft in phase with such vibrations consisting of one or more floats, each float comprising a plurality of top and bottom variable volume chambers, each adapted to contain gas and having a common wall and other walls, the pressure of said gas in the different chambers and the volume of the different chambers being such that the frequency of vibrations of the other walls of the different chambers are not equal.

3. In a helicopter, a body having operating parts that vibrate under some conditions, in combination with means for preventing such vibrations from being transferred to a supporting surface for said aircraft and transferred back to said aircraft in phase with such vibrations consisting of one or more floats, each float comprising an envelope containing a gas and having a bottom wall of abrasion resisting material for contacting a landing surface and a top wall adapted to be connected to the body of the helicopter, and a partition within said envelope to separate the same into a plurality of chambers between said top and bottom walls, the pressure of the gas in one of said chambers being less than the pressure of the gas within at least one other chamber.

4. A float for a helicopter comprising an elongated envelope of expansible material having longitudinally extending partitions dividing said float into a plurality of upper side-by-side cells and a single lower cell, the upper wall of said lower cell constituting the bottom walls of said upper cells and the bottom wall of said lower cell constituting a landing surface contacting portion, means carried by the external walls of said upper cells for connecting said float to a helicopter, said upper and lower cells having separate inlet means for admitting gas under pressure, whereby the gas in said upper and lower cells can be maintained at different pressure.

5. A float for a helicopter comprising an elongated envelope of expansible material having longitudinally extending partitions dividing said float into a plurality of upper side-by-side cells and a lower cell, the upper wall of said lower cell constituting the bottom walls of said upper cells, a landing surface contacting member carried by the bottom wall of said lower cell, and means carried by the external walls of said upper cells for connecting said float to a helicopter.

BORIS P. LABENSKY.

REFERENCES CITED

The following references are of record in the file of this patent:

UNITED STATES PATENTS

| Number | Name | Date |
|---|---|---|
| 1,489,619 | Isavaris | Apr. 8, 1924 |
| 2,167,398 | Tubbs | July 25, 1939 |
| 2,223,625 | Krupp | Dec. 3, 1940 |
| 2,349,584 | Arnstein | May 23, 1944 |
| 2,375,973 | Cooper et al. | May 15, 1945 |
| 2,391,326 | McKinley | Dec. 18, 1945 |
| 2,396,189 | Millar | Mar. 5, 1946 |

FOREIGN PATENTS

| Number | Country | Date |
|---|---|---|
| 302,232 | Great Britain | Mar. 5, 1930 |